(12) United States Patent
Koyama

(10) Patent No.: US 7,801,410 B2
(45) Date of Patent: Sep. 21, 2010

(54) VIDEO TRANSFER SYSTEM

(75) Inventor: Shin-ichi Koyama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1102 days.

(21) Appl. No.: 11/298,122

(22) Filed: Dec. 9, 2005

(65) Prior Publication Data

US 2006/0127057 A1 Jun. 15, 2006

(30) Foreign Application Priority Data

Dec. 15, 2004 (JP) ............................. 2004-363202
Dec. 24, 2004 (JP) ............................. 2004-374768

(51) Int. Cl.
*H04N 5/94* (2006.01)
(52) U.S. Cl. .................. 386/51; 386/47; 369/47.18; 369/53.32
(58) Field of Classification Search .................. 386/46, 386/47, 49, 51; 369/47.18, 53.32; 370/240, 370/240.01, 240.12–240.15
See application file for complete search history.

(56) References Cited

U.S. PATENT DOCUMENTS 5,633,871 A * 5/1997 Bloks .......................... 370/471
6,049,570 A * 4/2000 Fukunaga et al. ...... 375/240.12

FOREIGN PATENT DOCUMENTS

JP 05-153553 * 6/1993
JP 2004-213709 * 7/2004

* cited by examiner

*Primary Examiner*—Thai Tran
*Assistant Examiner*—Mishawn Dunn
(74) *Attorney, Agent, or Firm*—Cowan, Liebowitz & Latman, P.C.

(57) ABSTRACT

When the picture drops out in a part of video image data transmitted by a video transmitting apparatus, the video transmitting apparatus outputs a command indicating that the scene drops out, together with the video image data, to a video receiving apparatus. In accordance with this command, the video receiving apparatus displayed a predetermined indication that the scene drops out, or controls the re-recording of video image data.

13 Claims, 6 Drawing Sheets

| OPECODE | PICTURE DROPOUT |
|---|---|
| OPERAND (0) | DROPOUT PARAMETER |
| OPERAND (1) | DROPOUT START POSITION |

VIDEO TRANSFER SYSTEM

BACKGROUND OF THE INVENTION

1. Field of the Invention

The present invention relates to a video transfer system that reproduces the video image data recorded on the recording medium and transfers it to an external apparatus, and a video transmitting apparatus and a video receiving apparatus that make up the video transfer system.

2. Related Background Art

The HDV specifications (Specifications of HDV Recording Format Version 1.0 September 2003) for recording the MPEG2 coded data on the magnetic tape on which the video image data conforming to a DV (Digital Video) method is recorded, were settled by an HD Digital VCR Conference. The HDV specifications are specifications for recording the HD (High Definition) video image data. Such a technology for recording the HD video image data was also offered by Japanese Patent Application Laid-Open No. 2001-275076, for example.

A so-called nonlinear editing system of connecting a player that reproduces the video image data recorded on the magnetic tape to a personal computer (hereafter referred to as a PC), transferring the video image data, and capturing and editing the video image data on the PC has been generally employed.

By the way, there may happen that a scene is not correctly reproduced due to blinding of a reproducing head or instantaneous bad contact of the head, when the magnetic tape is reproduced by the player. Or there is possibility that the scene may not be reproduced correctly, because part of the recorded data is broken, or the recording medium is damaged. Such a situation is a trouble that may occur in the disk, as well as the magnetic tape.

As a cause of such trouble, a reproduction error occurs in the player, if the error correcting process becomes imperfect due to large dropout or erroneous reproduced data. If this reproduction error occurs during reproduction of the video image data compressed by an MPEG compression method, the following problems arise.

That is, the MPEG compression method employed for the HDV specifications is a technology that enables high compression by using the bidirectional prediction between pictures. Specifically, in an encoding unit named a Group of Picture (hereafter referred to as a GOP), a single intraframe coded image called an I frame is included and the remaining images are composed of the interframe coded image called a P frame or a B frame to be decoded by referring to the I frame. When the reproduction error occurs momentarily at the timing of I frame, for example, all the image of oneGOP becomes to be of reproduction error because the I frame drops out, even if the error is resolved immediately soon. Since oneGOP is usually 15 frames, if the error occurs in the I frame, the video is not outputted for a period of about 0.5 seconds, or the freeze-video not updated from the previous scene is outputted.

And since in a state of reproduction error, the video image data is not outputted to the outside, or the freeze-video image or degraded video is outputted to the outside, the PC connected to the player ceases to receive, or receives the video image data of poor quality, whereby the reproduction error only obstructs the viewing or editing because its cause is not known on the PC side.

SUMMARY OF THE INVENTION

To solve the above-mentioned problems, it is an object of this invention to notify the user of a situation where the picture drops out due to a reproduction error, so that the output of the video is stopped or a freeze state occurs.

Also, it is another object of the invention to capture correctly the video image data necessary for viewing or editing when the picture drops out due to a reproduction error and the output of the video image is stopped or the video image becomes in a freeze state.

In order to achieve the above object, according to one preferred embodiment of the invention, a video transfer system of the present invention comprises a video transfer apparatus and a video receiving apparatus, wherein the video transfer apparatus comprises read-out means for reading out compressed video image data recorded on a recording medium, detection means for detecting a dropout picture in the compressed video image data read out from the recording medium by the read-out means, generation means for generating the command data indicating the information concerning the dropout picture detected by the detection means, and output means for outputting the compressed video image data read out from the recording medium by the read-out means and the command data generated by the generation means, and wherein the video receiving apparatus comprises input means for inputting the compressed video image data and the command data outputted from the output means, decoding means for decoding the compressed video image data inputted from the input means, and control means for, upon acquiring the command data from the input means controlling an indication of notifying the dropout picture so as to be displayed on a monitor for displaying the video image represented by the video image data decoded by the decoding means.

Also, according to another embodiment of the invention, a video transmitting apparatus of the present invention comprises read-out means for reading out the compressed video image data recorded on a recording medium, detection means for detecting a dropout picture in the compressed video image data read out from the recording medium by the read-out means, generation means for generating command data indicating the information concerning the dropout picture detected by the detection means, and output means for outputting the compressed video image data read out from the recording medium by the read-out means and the command data generated by the generation means.

Also, according to another embodiment of the invention, a video receiving apparatus of the present invention comprises input means for inputting the compressed video image data outputted from an external transmitting apparatus, detection means for detecting a dropout picture in the video image data inputted from the input means, decoding means for decoding the video image data inputted from the input means, and control means for, upon the detection means detecting the dropout picture controlling an indication of notifying the dropout picture so as to be displayed on a monitor for displaying the video represented by the video image data decoded by the decoding means.

Also, according to another embodiment of the invention, a program for causing a computer to execute a control method for a video receiving apparatus comprising an input step of inputting the compressed video image data outputted from an external transmitting apparatus, a detection step of detecting a dropout picture in the input video image data, a decoding step of decoding the input video image data, and a control step of, upon detecting the dropout picture at the detection step, controlling an indication of notifying the dropout picture so as to be displayed appear on a monitor for displaying the video represented by the video image data decoded at the decoding step.

Other objects and features of the invention will be apparent from the following detailed description of the invention with reference to the accompanying drawings.

DETAILED DESCRIPTION OF THE PREFERRED EMBODIMENTS

The preferred embodiments of the present invention will be described below with reference to the drawings.

First Embodiment

Figure 8:
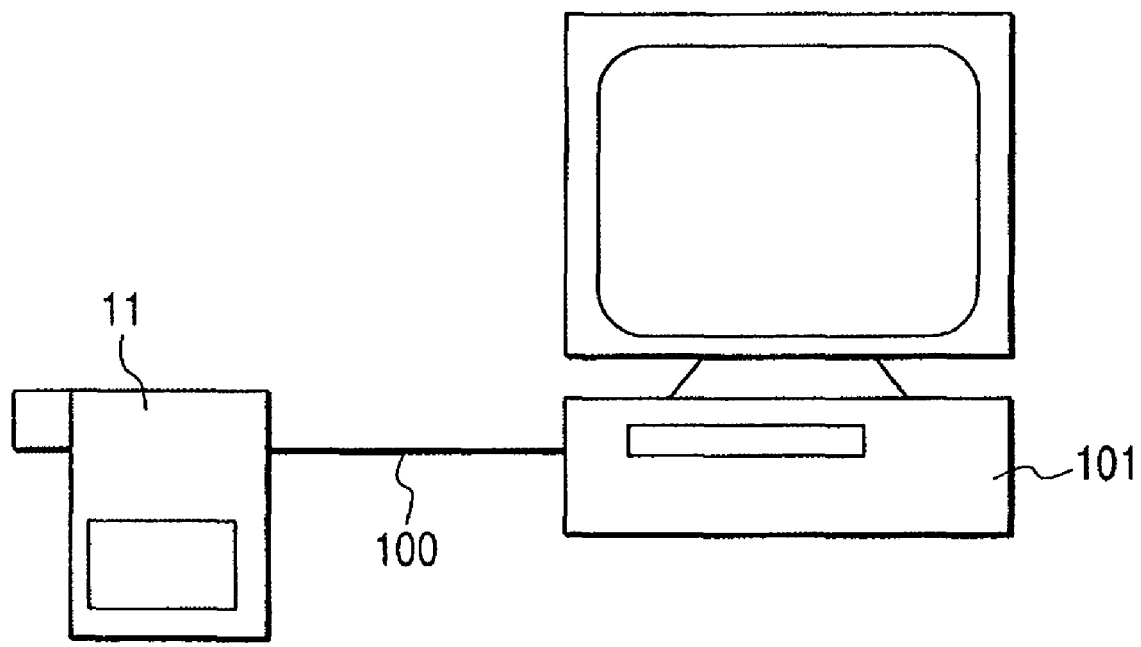
FIG. 8 is a view showing the configuration of a video transfer system according to each embodiment of the invention.

FIG. 8 is a view showing the configuration of a video transfer system according to each embodiment of the invention.

In FIG. 8, reference numeral 11 denotes a video recorder having a reproduction function conforming to the HDV specifications, which is one example of a video transmitting apparatus. Reference numeral 101 denotes a personal computer (PC) that is one example of a video receiving apparatus. Reference numeral 100 denotes a cable of IEEE1394 serial path that is one example of a transfer medium connecting the video recorder 11 and the PC 101.

The video recorder 11 reproduces the compressed video image data in accordance with an MPEG2 method as defined in the HDV specifications (the MPEG method has been already described in various documents and its technical explanation is omitted here). The video image data reproduced by the video recorder 11 is converted into isochronous packets and transmitted on the IEEE1394 serial bus (the standard of the IEEE1394 has been already described in various documents and its technical explanation is omitted here).

The video recorder 11 and the PC 101 have IEEE1394 terminals and can communicate the video image data of MPEG2. As shown in FIG. 8, the PC 101 and the video recorder 11 are connected to each other via the IEEE1394 cable 100. The PC 101 receives the video image data compressed by the MPEG2 from the video recorder 11, decodes it, and displays it on a monitor of the PC 101. Or, when receiving the video image data, the PC 101 can perform an operation called a capture at the same time, that is, record the received video image data into a hard disk drive (hereinafter referred to as an HDD) built in the PC 101. The configuration and operation of the PC 101 will be described later.

Figure 1:
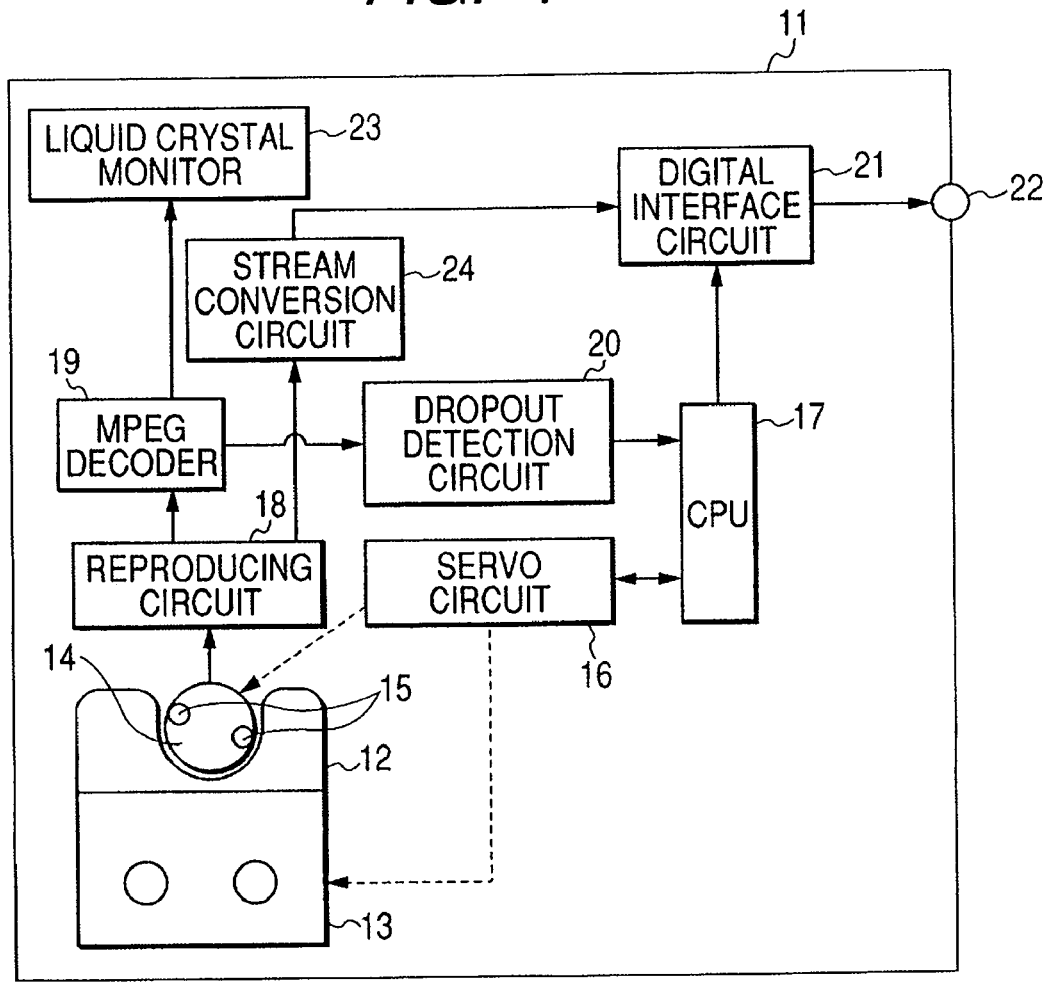
FIG. 1 is a block diagram showing the configuration of a video transmitting apparatus according to a first embodiment of the present invention.

Subsequently, the configuration of the video recorder 11 will be described below. FIG. 1 is a block diagram showing the configuration of the video recorder 11.

In FIG. 1, a cassette 13 including therein a magnetic tape 12 is mounted in the video recorder 11. And the video recorder 11 comprises a drum 14 that is rotated in the recording or reproducing operation, a magnetic head 15 attached on the drum 14, a servo circuit 16 for controlling the operation of the drum 14 and a capstan, not shown, a controller (CPU) 17 for controlling the operation of each part, and a reproducing circuit 18 for processing the video image data reproduced by the magnetic head 15 from the magnetic tape 12. Further, the video recorder comprises an MPEG decoder 19 for decoding the reproduced data outputted from the reproducing circuit 18, a dropout detection circuit 20 for detecting a reproduction error from a state of reproduced data, a stream conversion circuit 24 for converting MPEG2 stream form into transport stream (TS) for transmission, a digital interface (hereinafter referred to as DIF) circuit 21 according to the IEEE1394, a terminal 22 for connecting the IEEE1394 cable, and a liquid crystal monitor 23 capable of displaying the decoded video image.

Next, the operation of the video recorder 11 will be described below. When the video image data according to the HDV specifications recorded on the magnetic tape 12 is reproduced, the cassette 13 is set on the video recorder 11. The video recorder 11 draws the magnetic tape 12 out of the cassette 13, and winds it around the drum 14. The servo circuit 16 takes charge of the mechanism control or the control for rotating the drum 14 or rotating the capstan for running the magnetic tape. The servo circuit 16 is controlled by the CPU 17. If the drum 14 is rotated, the magnetic head 15 attached on the drum 14 reads out the information recorded on the magnetic tape 12 by tracing the recording face of the magnetic tape 12. And the read information is sent to the reproducing circuit 18. The reproducing circuit 18 makes the electromagnetic conversion of converting the video image data recorded as the magnetic information into an electrical signal of digital data. Moreover, the video image data of digital data is subjected to a reproduction process.

When the video image data undergoing the necessary reproduction process in the reproducing circuit 18 is transmitted to the outside in a compressed state, a transport stream (TS) packet conversion is performed in a stream conversion circuit 24. The video image data converted into TS packets is sent to the DIF circuit 21, converted into isochronous packets on the IEEE1394 serial bus in the DIF circuit 21, and isochronously transferred from the IEEE1394 terminal 22 to the PC 101.

On the other hand, the video image data reproduced by the reproducing circuit 18 is inputted into the MPEG decoder 19 in charge of the decoding process, where an expansion process in the spatial direction by inverse DCT conversion or an expansion process in compressed state in the time axis direction by prediction encoding is performed. The video image data decoded by the MPEG decoder 19 is displayed as a reproduced video on the liquid crystal monitor 23. The MPEG decoder also makes the expansion in the time axis direction as described above. In the HDV specifications, one-GOP is composed of 15 frames, an intra-picture coded image called an I frame that exists only singly in oneGOP is firstly decoded and a P frame (inter-picture forward prediction coded image) and a B frame (bidirectional prediction coded image) are decoded, employing it.

Figure 2:
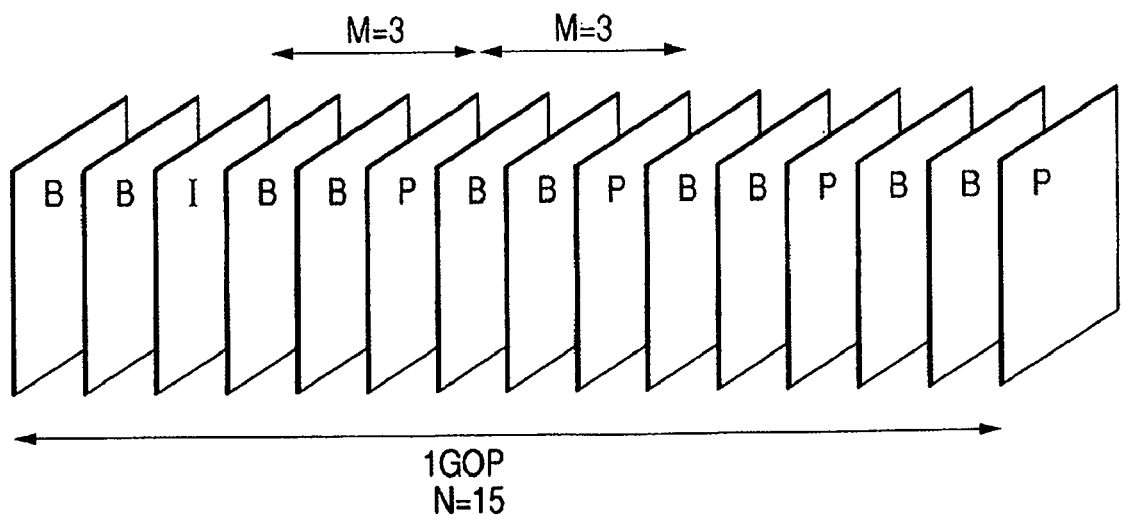
FIG. 2 is a view for explaining the structure of a GOP.
Figures 3, 4:
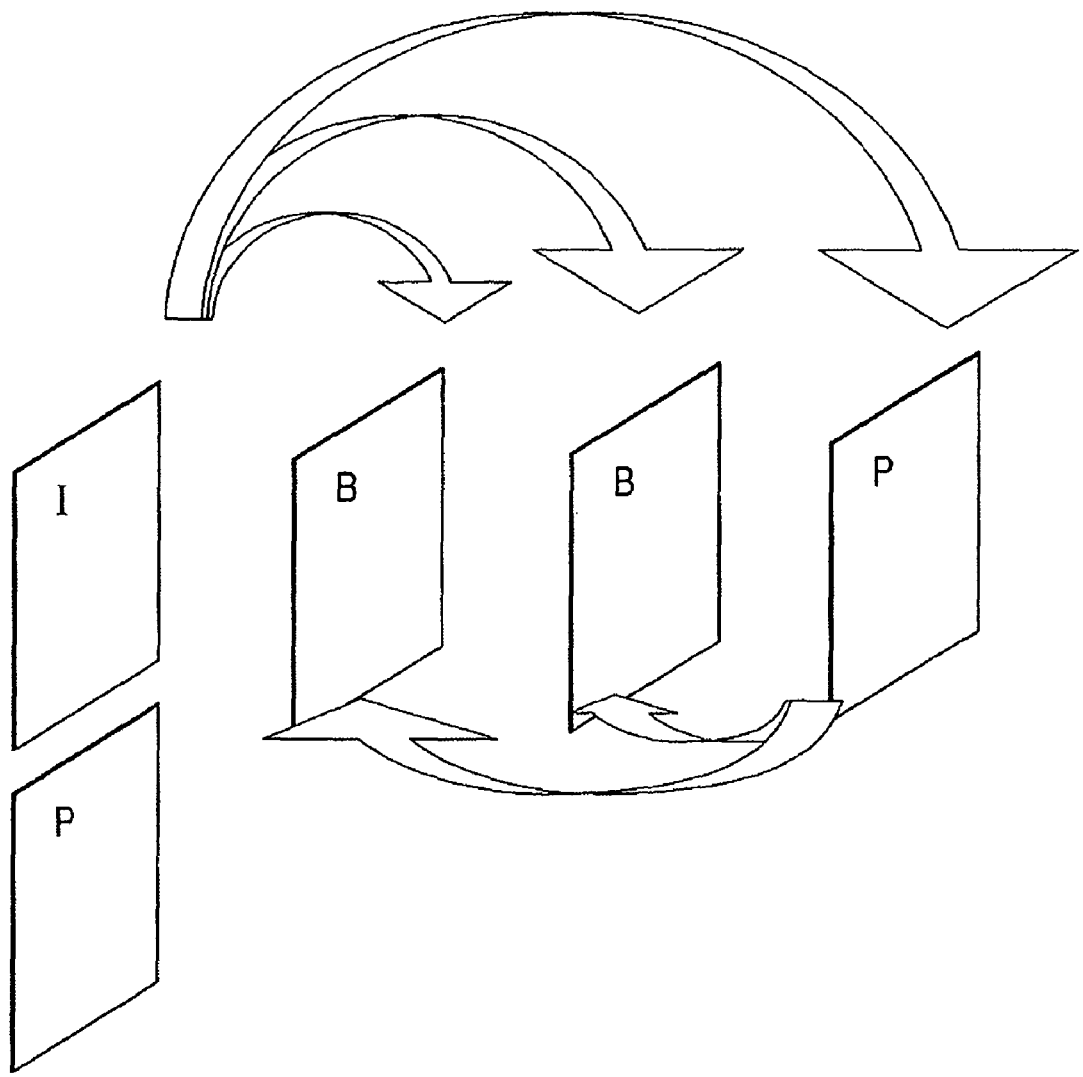
FIG. 3 is a view for explaining a decoding process of the GOP.
FIG. 4 is a view showing a configuration example of a control command.

Referring now to FIGS. 2 and 3, the GOP structure and the decoding process in the MPEG2 will be described below. FIG. 2 shows the GOP structure where the number N of frames is 15, that is defined in the HDV specifications. Moreover, it is indicated that the frame period M at which the I frame or P frame appears in oneGOP is 3. In FIG. 2, only one I frame exists in oneGOP. FIG. 3 is a view for explaining the decoding process of each frame in terms of the reference relation between I, P and B frames. As shown in FIG. 3, the I frame is subject to intra-picture encoding and can be decoded by itself. Also, the P frame is decoded employing data of other P frame or I frame. Moreover, the B frame is decoded employing the I frame or two P frames.

Therefore, if any I frame drops out, all the data of oneGOP can not be restored, causing a situation where the image can not be updated for 15 frames or about 0.5 seconds. Also, if any P frame drops out, all the frames referring to the P frame can not be restored, whereby there is usually an influence on the frames from the dropout P frame to the last of GOP and two B frames before the P frame, causing a situation where the images in-between can not be updated. Also, if the B frame drops out, a situation occurs where only that B frame is not updated.

Herein, there may happen a scene is not correctly reproduced due to blinding of a reproducing head or instantaneous bad contact of the head, when the scene is reproduced by the player, as previously described. Or there occurs a situation where the magnetic tape may not be reproduced correctly, because part of the recorded data is broken, or the recording medium is damaged. Also, the same thing happens when the MPEG decoder 19 makes an error operation. Such situation is a trouble that may occur in the disk, as well as the magnetic tape. When an unrecoverable error occurs due to this trouble, and the frame (picture) in the reproduced video image data drops out, the dropout detection circuit 20 detects the reproduction error.

The dropout detection circuit 20 acquires the information concerning a decoding situation from the MPEG decoder 19. If data dropout is detected, the dropout detection circuit 20 detects which picture data drops out, the kind of dropout picture, I picture, P picture or B picture, and the position of the dropout picture, and informs the resultant information to the CPU 17.

The CPU 17 generates a different asynchronous transmission packet (asynchronous packet) depending on which picture drops out among the I, P and B frames. Moreover, the sequence number of GOP including the dropout picture is added to the generated asynchronous packet. And the CPU 17 instructs the DIF circuit 21 to output the generated asynchronous packet from the IEEE1394 terminal 22 to the PC 101 in asynchronous transmission. The DIF circuit 21 performs an operation of sending out the video image data acquired from the stream conversion circuit 24 to the PC 101 in isochronous packets, and at the same time performs an operation of sending out the asynchronous packets instructed from the CPU 17 to the PC 101 at a transmission timing as defined in the IEEE1394 standard. In this way, the isochronous packets concerning the reproduced video image data and the asynchronous packet indicating the occurrence of reproduced error are outputted from the IEEE1394 terminal to the outside.

Referring to FIG. 4 the above-mentioned asynchronous packets, that is, a control command for the PC 101, will be described below. FIG. 4 is an example of the control command constituted by the asynchronous packet.

The control command as shown in FIG. 4 has a frame structure in employing a command called a "CTS" that makes the communication employing the Write transaction usable in the asynchronous packet as defined in the IEEE1394 standard. This is further defined in an FCP (Function Control Protocol) as defined in the IEC 61883-1, in which various commands are defined in "AV/C Digital Interface Command Set General Specification Version 4.0, 1394 Trade Association". In this embodiment, the control command employs this CTS command, and if a dropout picture occurs and is detected during the reproduction, this control command is transmitted to the external apparatus to inform the external device that the picture dropout occurs in the reproduced video.

In FIG. 4, an Opecode field is a field for storing the code indicating the picture dropout, in which this command is the packet indicating the picture dropout. An Operand(0) field is a field for storing the dropout parameter, indicating the sequence number of GOP and which of the I, P and B frames the dropout picture is. An Operand(1) field is a field for storing the detection start position of dropout picture, indicating the time code or track number of dropout picture, the number of bytes being different dependently on its kind. By outputting this control command to the external apparatus, the external apparatus of communication partner receiving this control command can know the reason why the reception of video is stopped, or the video is degraded in quality such as freeze, and its position.

Though in this embodiment, the control command indicating the reproduction error is transmitted employing the asynchronous packet, the information indicated by this control command may be stored in the same isochronous packet as the video image data and sent to the external apparatus in this invention. As a method for storing the control command in the isochronous packet, the information indicated by the control command may be buried as the AUX data as defined in the HDV specifications. In this case, the video image data and the embedded information of dropout picture are transferred in the same stream by the TS packet.

Also, though in this embodiment, the dropout parameter in the Operand(0) field in FIG. 4 is described in terms of the I, B and P frames, when a plurality of pictures drops out, the information of all the dropout pictures or the information indicating the missing range of pictures may be also employed. In this way, various dropout parameters may be considered.

This invention is not limited to the above embodiment, but may be applied to various embodiments. For example, the transfer medium in the above embodiment is not limited to the IEEE1394 serial bus, but the IEEE1394 serial bus may be replaced with other transfer media (e.g., USB) (the USB has been already described in various documents and its technical explanation is omitted here).

As described above, with this embodiment, if the picture drops out during the reproduction, the information indicating the error status is notified to the external apparatus, which can know the reason why the received video is disordered and its position.

Second Embodiment

Figure 5:
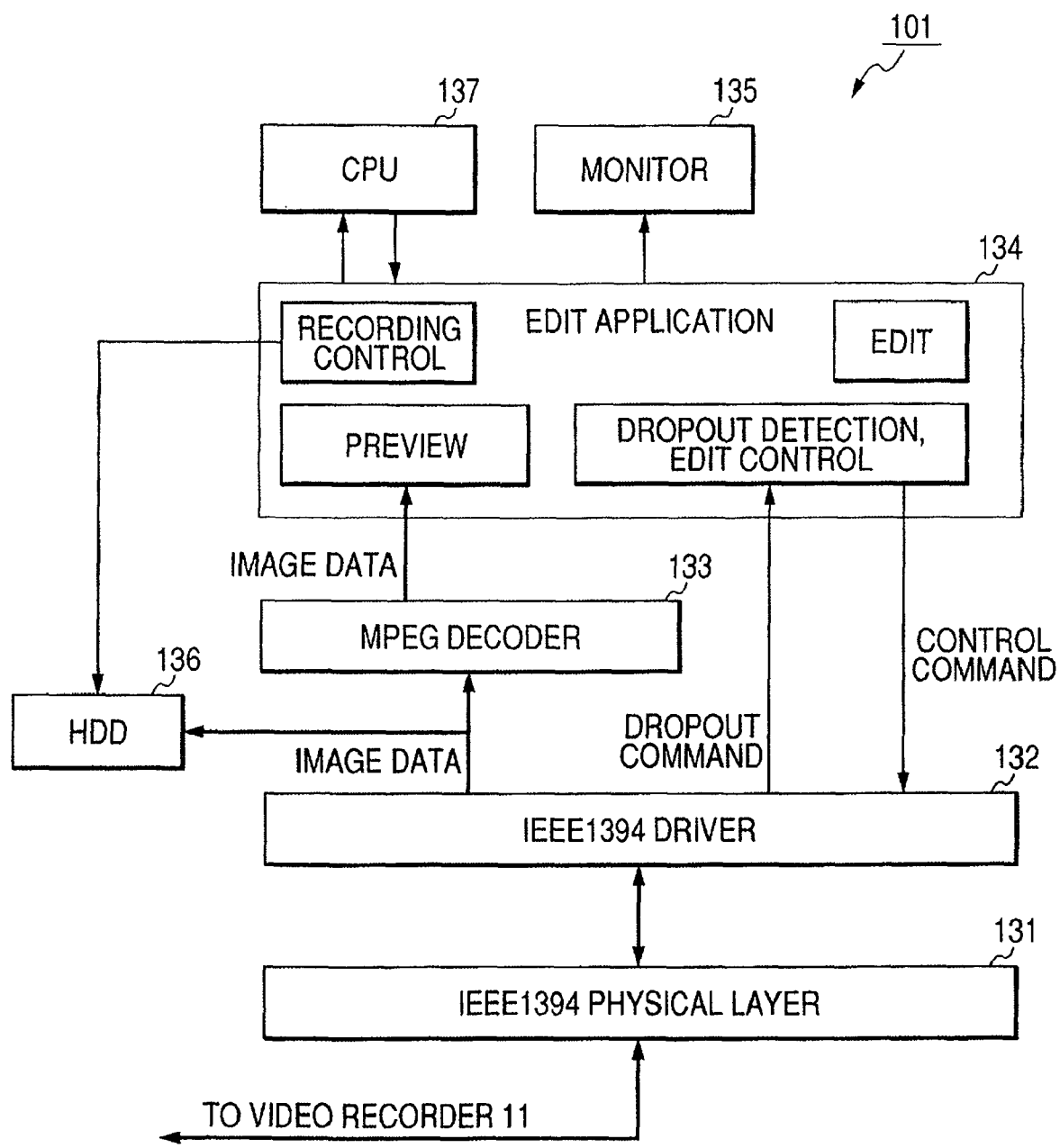
FIG. 5 is a block diagram showing the configuration of a video receiving apparatus according to a second embodiment.

A second embodiment of the invention will be described below. In this embodiment, the configuration and operation of a video receiving apparatus in the video transfer system as shown in FIG. 8 will be described below in detail. FIG. 5 is a block diagram showing the configuration of the PC 101 that is one example of the video receiving apparatus according to this embodiment.

A highly important configuration is that the PC 101 is provided with a function of controlling the video recorder 11 that is a video transmitting apparatus manually or automatically. A control method for this video recorder 11 may employ an FCP (Function Control Protocol) as defined in the IEC 61883-1. As the FCP, various commands are defined in "AV/C Digital Interface Command Set General Specification Version 4.0, 1394 Trade Association", and especially the video commands are defined in "AV/C Tape Recorder/Player Subunit Specification 2.4". Particularly, the automatic capturing of video image data called a batch capture is controlled by an editing application 134 in the PC 101 outputting a command of rewind, reproduction, stop, or fast feed for the scene to the video recorder 11 in asynchronous packet.

An MPEG decoder 133 in the PC 101 expands the received video in the time axis direction to make a preview of the received video image. In the HDV standard, oneGOP is composed of 15 frames, whereby an intra-picture coded image called an I frame that exists only singly in oneGOP is firstly decoded, and a P frame (inter-picture forward prediction coded image) and a B frame (inter-picture bidirectional coded image) are decoded employing it. The structure of GOP and the decoding process are the same as explained with FIGS. 2 and 3.

In the video transmitting apparatus, when a picture dropout occurs during the reproduction and the I, P or B picture is not normally reproduced, the MPEG compressed video image data received and captured by the PC 101 is naturally affected. At this time, the PC 101 may not allow a preview while capturing, or update the video in the edit mode. Thus, at this time, an asynchronous packet that is a packet for asynchronous transmission indicating the picture dropout is delivered from the video transmitting apparatus (video recorder 11), as described in the first embodiment.

This asynchronous packet is the control command as shown in FIG. 4, and has the frame structure of command called a CTS. This is the same as the control command that the PC 101 sends to the video recorder 11.

If the PC 101 receives the control command indicating the picture dropout, together with the video image data, from the outside (video recorder 11), a warning indication of "reproduction data missing occurred" is displayed on a monitor 135 (screen previewing the video) of the PC 101 during the preview of the video represented by the received video image data. When the picture dropout occurs, the display screen is not updated, the freeze image or black image of a scene immediately before the missing occurs is outputted. In this state (or immediately after), a warning indication is displayed to allow the user of the PC 101 to know the reason why the display image is not updated. Also, the warning indication at this time is implemented by displaying the indication information generated by a character generator (not shown) controlled by a CPU 137 which will be described below, upon an occasion of receiving a control command indicating that the picture drops out. At this time, the warning indication may be made by stopping the reproduction operation after the picture dropout under the control of the video recorder 11.

If the PC 101 receives the control command indicating that the picture drops out, together with the video image data, from the outside (video recorder 11), the following control can be made by the editing application, while the video image data is being recorded.

FIG. 5 is a block diagram showing the system configuration of the PC 101 according to the first embodiment.

In FIG. 5, the IEEE1394 terminal in the PC 101 corresponds to an IEEE1394 physical layer 131, from which various kinds of data including the MPEG compressed video image data sent from the video recorder 11 is inputted. As previously described, the video image data is transferred in isochronous packets. An IEEE1394 driver 132 accepts or delivers the data while controlling the IEEE1394 physical layer 131, and sends the MPEG compressed video image data to the MPEG decoder 133 and an HDD 136 in this embodiment. Further, if the control command indicating that the video image data has the picture dropout as shown in FIG. 4 is received from the video recorder 11, the control command is sent to the editing application 134.

The MPEG decoder 133 accepts the MPEG compressed video image data from the IEEE1394 driver 132, and decodes the video image data into previewable video image data, which is passed to the editing application 134. The editing application 134 displays the video image concerning the video image data processed by the MPEG decoder 133 on the monitor 135, and controls the IEEE1394 driver 132 and the HDD 136 under the control of the CPU 137 or based on the control command from the iEEE1394 driver 132 to record the MPEG compressed video image data from the IEEE1394 driver 132. The CPU 137 generally controls the overall PC 101. Also, the HDD 136 is a recording medium (hard disk) for recording the MPEG compressed video image data from the IEEE1394 driver 132.

If an asynchronous packet as shown in FIG. 4 is delivered via the IEEE1394 driver 132 to the editing application 134, it will be found that part of the video image data recorded on the HDD 136 drops out. In this case, the editing application 134 detects this asynchronous packet, and stops recording the video image data on the HDD 136, as well as sends a control command of stopping reproduction of the video and rewinding the scene via the IEEE1394 driver 132 and the IEEE1394 physical layer 131 to the video recorder 11.

This rewinding amount is controlled to be changed depending on the kind of I, B or P picture with the dropout parameter of packet and the start position of dropout picture, as shown in FIG. 4, and further the characteristic of recording format of the HDD 136, to rewind the scene up to the position before the start position of dropout picture. Also, in the HDV specifications, the ECC (Error Correcting Code) for reproduction is employed for a unit of tracks. In this case, it is required to rewind the scene more than that amount. And the PC 101 sends a control command for causing the video recorder 11 to perform reproduction again, whereby the dropout picture can be recorded again in the HDD 136. In this case, the recording file in the HDD 136 may be a different file from the video image data of dropout picture. Also, the video image data without dropout picture that is re-recorded correctly by deleting the video image data of dropout picture may be only recorded as one file.

With the configuration of this embodiment, when the video image during reception becomes in a freeze state, its situation can be notified to the user. Also, when part of the video during reception drops out due to a reproduction error and the video image becomes in the freeze state, the video image data necessary for the viewing may be captured later.

Third Embodiment

Figure 6:
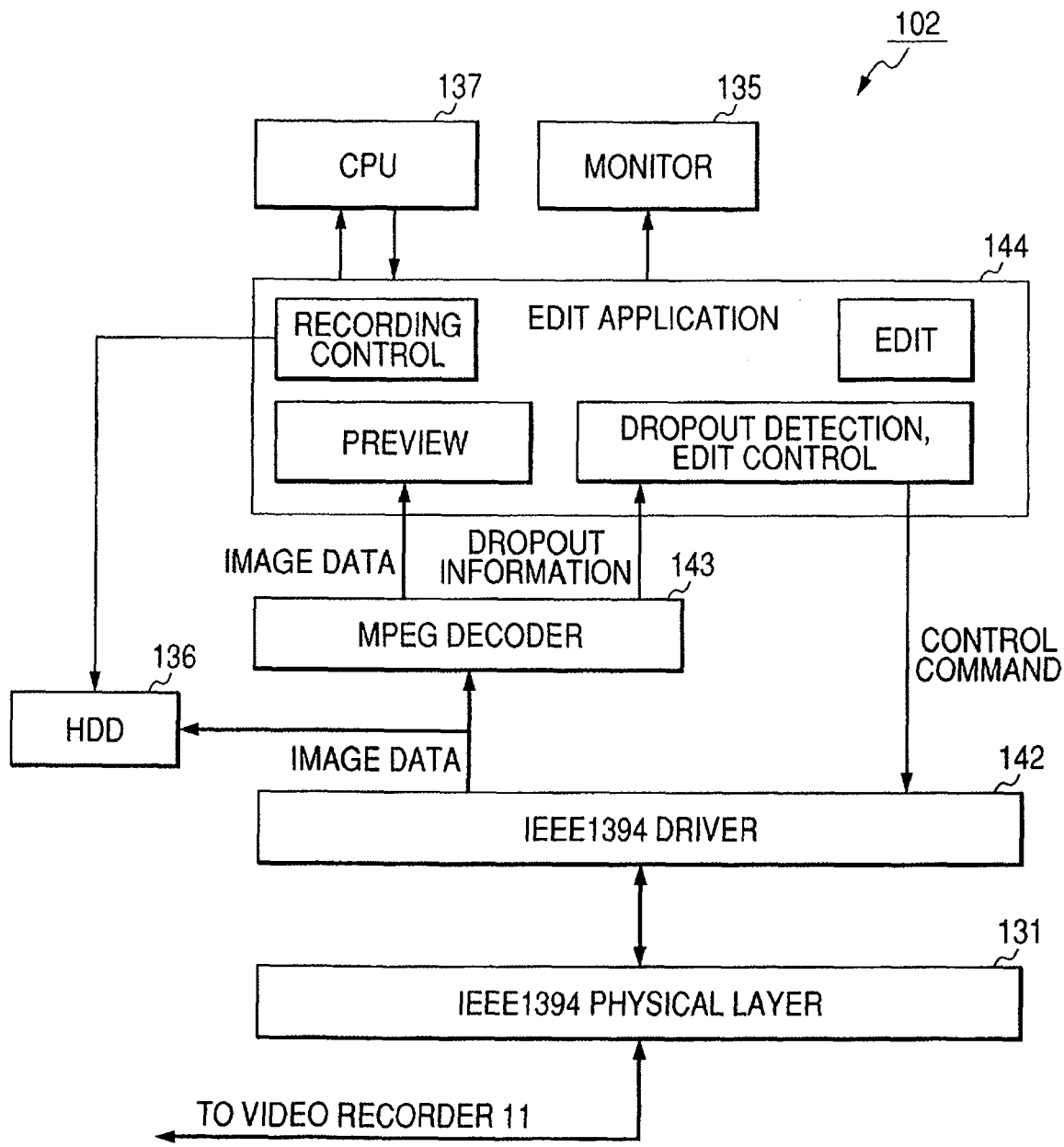
FIG. 6 is a block diagram showing the configuration of a video receiving apparatus according to a third embodiment.

A third embodiment of the invention will be described below. In this embodiment, the configuration and operation of a video receiving apparatus in the video transfer system as shown in FIG. 8 will be described below in detail. FIG. 6 is a block diagram showing the configuration of the PC 102 that is one example of the video receiving apparatus having a different function from the second embodiment. In FIG. 6, the parts having the same function as the PC 101 according to the second embodiment are designated by the same reference numerals as in FIG. 5, and not described here. The video transfer system according to the third embodiment is constructed by applying the PC 102 according to this embodiment to the PC 101 as shown in FIG. 8.

Though the PC 101 according to the second embodiment performs the operation based on the control command indicating the picture dropout as shown in FIG. 4, which is received from the video recorder 11, the PC 102 according to the third embodiment detects the dropout picture from the video image data transmitted from the video recorder 11, and processes the image data based on the detection result.

An IEEE1394 driver 142 accepts or delivers the data while controlling the IEEE1394 physical layer 131, and sends the MPEG compressed video image data to an MPEG decoder 143 and the HDD 136 in this embodiment.

The MPEG decoder 143 accepts the MPEG compressed video image data from the IEEE1394 driver 142, and decodes the video image data into previewable video image data, which is passed to an editing application 144. Moreover, the MPEG decoder 143 detects the dropout picture in the midst of decoding the video image data received from the IEEE1394 driver 142, and sends the dropout information based on the detection result to the editing application 144. Herein, the detection of dropout picture by the MPEG decoder 143 is made by confirming the sequence number described in the video image data from the IEEE1394 driver 142, and detecting that the sequence number is discontinuous and the video image data is not updated. Also, the dropout information sent from the MPEG decoder 143 to the editing application 144 includes the information indicating which of the I, P and B frames the dropout picture is, and the number of dropout pictures.

The editing application 144 displays the video image data processed through the MPEG decoder 143 on the monitor 135, and controls the IEEE1394 driver 142 and the HDD 136 based on the dropout information from the MPEG decoder 143 to record the MPEG compressed video image data from the IEEE1394 driver 142.

In this embodiment, the editing application 144 does not perform the re-recording process for the video image data, if there is no frame dropout in the image data recorded in the HDD 136, even though the picture dropout occurs inside the PC 102 such as the MPEG decoder 143, and is detected by the MPEG decoder 143.

With the configuration of this embodiment, when part of the video during reception drops out, and the video image becomes in a freeze state, the video image data necessary for the viewing may be captured later without the control command sent from the transmitting apparatus.

Fourth Embodiment

Figure 7:
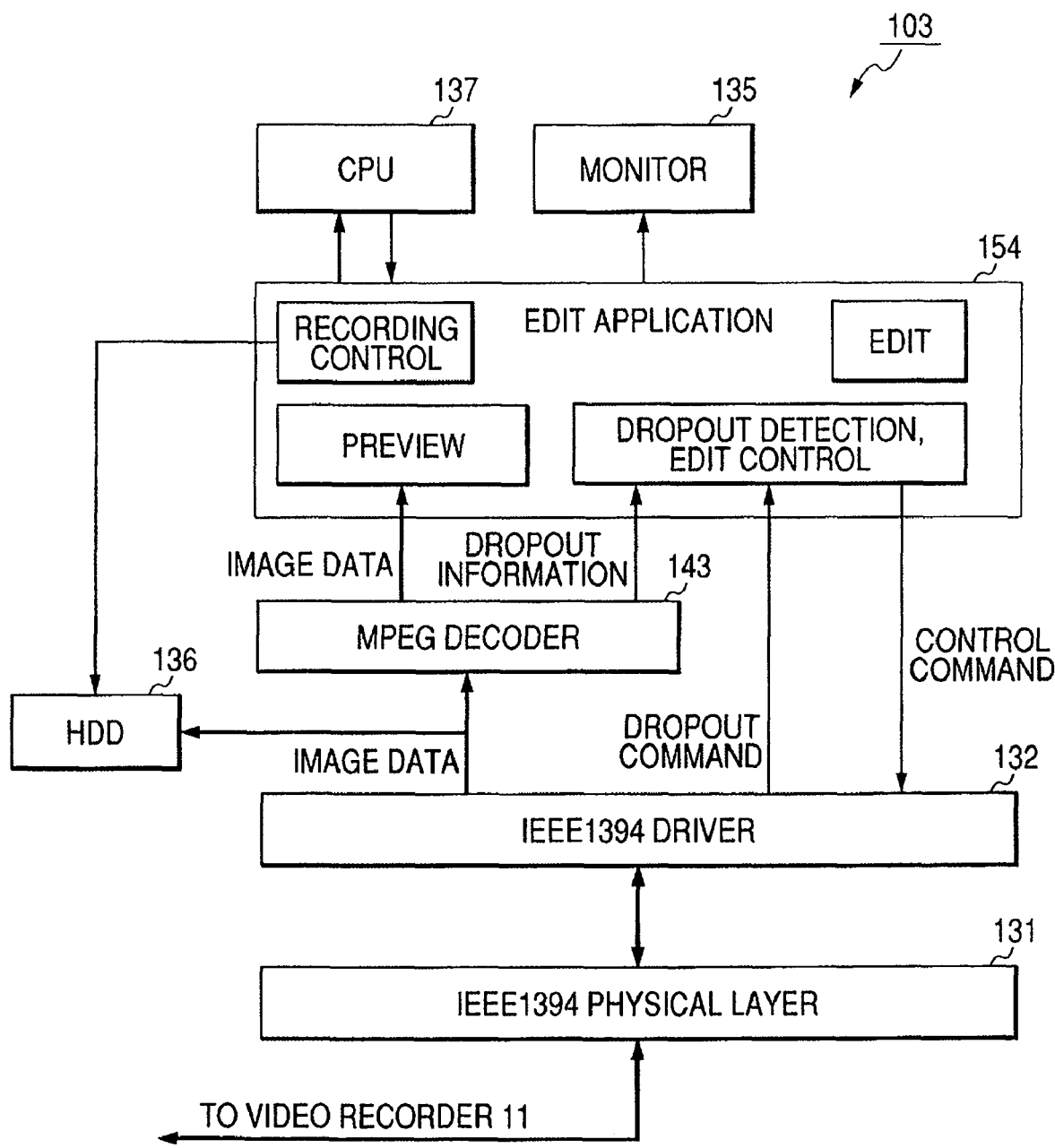
FIG. 7 is a block diagram showing the configuration of a video receiving apparatus according to a fourth embodiment.

A fourth embodiment of the invention will be described below. In this embodiment, the configuration and operation of a video receiving apparatus in the video transfer system as shown in FIG. 8 will be described below in detail. FIG. 7 is a block diagram showing the configuration of the PC 103 that is one example of the video receiving apparatus having a different function from the second and third embodiments. In FIG. 7, the parts having the same function as the PC 101 according to the second embodiment are denoted by the same reference numerals as in FIG. 5, and not described here. The video transfer system according to the fourth embodiment is constructed by applying the PC 103 according to this embodiment to the PC 101 as shown in FIG. 8.

In this embodiment, an editing application 154 displays the video image represented by the video image data processed through the MPEG decoder 143 on the monitor 135. Further, the editing application 154 controls the IEEE1394 driver 132 and the HDD 136 based on the control command indicating the picture dropout from the IEEE1394 driver 132, or the dropout information from the MPEG decoder 143, to record the MPEG compressed video image data from the IEEE1394 driver 132.

In this way, in the PC 103 according to the fourth embodiment, the editing application 154 detects the picture dropout in the video image data, based on two information including the control command from the IEEE1394 driver 132 and the dropout information from the MPEG decoder 143, as shown in FIG. 7, whereby the detection precision of picture dropout is improved.

In the second embodiment as previously described, if the picture drops out due to blinding or bad contact of the head at the time of the reproduction of the video recorder 11, it is possible to re-record the video image data without picture dropout by sending the video image data from the video recorder 11 again. However, if the data missing occurs due to blinding or tape scar at the time of recording in the video recorder 11, the picture at the same spot may drop out even by sending the video image data from the video recorder 11 multiple times.

To cope with this situation, the PC 103 terminates re-sending the video image data from the video recorder 11, if the picture dropout at the same spot is repeatedly detected for a predetermined period or by a predetermined number of times, in which the dropout spot is attached with a mark or saved as another data, and presented to the user, after which the recording into the HDD 136 is resumed.

With the configuration of this embodiment, when part of the video image being received drops out, and the video becomes in a freeze state, the video image data necessary for the viewing may be captured later, and the editing operation can be continued smoothly.

This invention is not limited to the above embodiments, but various modifications may be made thereto. For example, the transfer medium in the second to fourth embodiments is the IEEE1394 serial bus with the IEEE1394 cable 100, but the invention is not limited thereto. The transfer medium may be a USB (Universal Serial Bus).

The object of the invention may be achieved by supplying a storage medium recording a program code of the software implementing the functions of each embodiment as described above to the system or apparatus, in which the computer (or CPU or MPU) in the system or apparatus reads and executes the program code stored in the storage medium.

In this case, the program code itself read from the storage medium implements the functions of each embodiment, and the program code and the storage medium storing the program code may constitute the invention.

The storage medium from which the program code is supplied may be a flexible disk, a hard disk, an optical disk, an optical magnetic disk, a CD-ROM, a CD-R, a magnetic tape, a non-volatile memory card, or a ROM.

Also, the functions of each embodiment may be implemented by executing the program code read by the computer, or performing a part or all of the actual process based on instructions of the program code under the control of an OS (basic system or operating system) operating on the computer.

Moreover, the functions of each embodiment may be implemented by writing the program code read from the storage medium into a function extension board inserted into the computer or a memory provided for a function extension unit connected to the computer, and performing a part or all of the actual process based on instructions of the program code under the control of the CPU provided for the function extension board or function extension unit.

The present invention is not limited to the above embodiments and various changes and modifications can be made within the spirit and scope of the present invention. Therefore to apprise the public of the scope of the present invention, the following claims are made.

This application claims priority from Japanese Patent Application Nos. 2004-363202 filed Dec. 15, 2004 and 2004-374768 filed on Dec. 24, 2004, which are hereby incorporated by reference herein.

What is claimed is:

1. A video transfer system comprising a video transfer apparatus and a video receiving apparatus connected to said video transfer apparatus via a data communication line,
wherein said video transfer apparatus comprises:
a read-out unit configured to read out compressed video image data recorded on a recording medium;
a detection unit configured to detect a dropout picture in the compressed video image data read out from said recording medium by said read-out unit;
a generation unit configured to generate command data arranged to control editing of the compressed video image data in accordance with the information concerning the dropout picture detected by said detection unit;
a conversion unit configured to convert the compressed video image data and the command data thereof into packets; and
an output unit configured to output the packets via the data communication line; and
wherein said video receiving apparatus comprises:
an input unit configured to input the packets via the data communication line, and acquire the compressed video image data and the command data thereof from the input packets;
a decoding unit configured to decode the compressed video image data inputted from said input unit;
an editing unit configured to input video image data decoded by said decoding unit and perform an editing operation of the input video image data; and
a control unit, upon acquiring the command data from said input unit, configured to control the editing operation by said editing unit and outputting of an indication of notifying the dropout picture in the edited video image data to display the indication on a monitor for displaying the video image represented by the video image data decoded by said decoding unit.

2. A video transfer apparatus connected with an external receiving apparatus via a data communication line, comprising:
a read-out unit configured to read out compressed video image data recorded on a recording medium;
a detection unit configured to detect a dropout picture in the compressed video image data read out from said recording medium by said read-out unit;
a generation unit configured to generate command data arranged to control editing of the compressed video image data in accordance with the information concerning the dropout picture detected by said detection unit;
a conversion unit configured to convert the compressed video image data and the command data thereof into packets; and
an output unit configured to output the packets via the data communication lin;
wherein the information concerning the dropout picture indicated by the command data is the information indicating the kind of said dropout picture, and includes the information indicating the dropout start position.

3. An apparatus according to claim 2, further comprising a decoding unit configured to decode the compressed video image data read out from said recording medium by said read-out unit, wherein said generation unit acquires the information indicating which of an intra-picture encoded picture, an inter-picture forward predictive encoded picture and an inter-picture bidirectional encoded picture said detected dropout picture corresponds to, from the decoded result of said decoding unit and generates the command data.

4. An apparatus according to claim 3, wherein the information concerning the dropout picture indicated by the command data includes a part or all of the information of a time code, a track number and a GOP sequence number of the detected dropout picture.

5. An apparatus according to claim 2, wherein said conversion unit converts the compressed video image data into a form of isochronous packets, and converts the command data into a form of asynchronous packet.

6. An apparatus according to claim 2, wherein said output unit outputs the packets of the compressed video image data with the packets of the command data being embedded in a stream of the compressed video image data.

7. A video receiving apparatus connected with an external transmitting apparatus via a data communication line, comprising:
an input unit configured to input packets outputted from said external transmitting apparatus via the data communication line, and acquire compressed video image data and command data indicating an occurrence of a dropout picture from the input packets;
a detection unit configured to detect the dropout picture in the compressed video image data inputted from said input unit according to the command data inputted from said input unit;
a decoding unit configured to decode the compressed video image data inputted from said input unit;
an editing unit configured to input video image data decoded by said decoding unit and perform an editing operation of the input video image data; and
a control unit, upon said detection unit detecting said dropout picture, configured to control the editing operation by said editing unit and outputting of an indication of notifying the dropout picture in the edited video image data to display the indication on a monitor for displaying the video image represented by the video image data decoded by said decoding unit.

8. An apparatus according to claim 7, further comprising a recording control unit configured to effect the control to record the compressed video image data inputted from said input unit on a recording medium, wherein the recording control unit effects the control to stop the recording of said compressed video image data, when said dropout picture is detected by said detection unit.

9. An apparatus according to claim 8, wherein said recording control unit records a file including the compressed video image data in which the dropout picture is detected, separately from a file including the compressed video image data in which the dropout picture is not detected.

10. An apparatus according to claim 7, further comprising an instruction unit configured to instruct for the external transmitting apparatus to re-output the compressed video image data which does not include the dropout picture if the detection unit detects the dropout picture.

11. An apparatus according to claim 10, wherein said instruction unit decides at least a return amount of scene if said detection unit detects the dropout picture, and sends a control command for re-outputting the compressed video image data from a position corresponding to the return amount to the external transmitting apparatus.

12. An apparatus according to claim 11, wherein if a situation where the dropout picture is detected again from the re-outputted video image data by said detection unit continues for a predetermined period or over a predetermined number of times, said instruction unit stops a re-output instruction to the transmitting apparatus.

13. A computer-executable program stored on a non-transitory computer-readable storage medium, comprising a program code for causing a computer to execute a control method for a video receiving apparatus connected with an external transmitting apparatus via a data communication line, said control method comprising:

an input step of inputting packets outputted from said external transmitting apparatus via the data communication line, and acquiring compressed video image data and command data thereof indicating an occurrence of a dropout picture from the input packets;

a detection step of detecting the dropout picture in the input compressed video image data according to the command data inputted in the input step;

a decoding step of decoding the compressed video image data input in said input step;

an editing step of inputting video image data decoded in said decoding step and performing an editing operation of the input video image data; and a control step of, upon the detection step detecting said dropout picture, controlling the editing operation in said editing step and outputting of an indication of notifying the dropout picture in the edited video image data to display the indication on a monitor for displaying the video image represented by the video image data decoded in said decoding step.

\* \* \* \* \*